United States Patent [19]

Davis

[11] Patent Number: 5,520,412
[45] Date of Patent: May 28, 1996

[54] THERMOPLASTIC AIR BAG COVER HAVING A MEMBRANE SWITCH

[75] Inventor: David J. Davis, Troy, Mich.

[73] Assignee: Larry Winget, Leonard, Mich.

[21] Appl. No.: 458,882

[22] Filed: Jun. 2, 1995

[51] Int. Cl.6 .................................................. B60R 21/20
[52] U.S. Cl. .................... 280/728.3; 280/731; 200/61.54
[58] Field of Search .............................. 280/731, 728.3, 280/728.1; 200/61.54, 61.55, 61.56, 61.57

[56] References Cited

U.S. PATENT DOCUMENTS

| | | | |
|---|---|---|---|
| 4,325,568 | 4/1982 | Clark et al. | 280/731 |
| 4,934,735 | 6/1990 | Embach | 280/731 |
| 5,013,065 | 5/1991 | Kreuzer | 280/731 |
| 5,062,661 | 11/1991 | Winget | 280/731 |
| 5,085,462 | 2/1992 | Gualtier | 280/731 |
| 5,186,490 | 2/1993 | Adams et al. | 280/731 |
| 5,308,106 | 5/1994 | Heidorn | 280/728.3 |
| 5,344,185 | 9/1994 | Cooke, II | 280/731 |
| 5,369,932 | 11/1994 | Leonelli | 280/731 |
| 5,399,819 | 3/1995 | Lang et al. | 280/731 |
| 5,465,998 | 11/1995 | Davis | 200/61.54 |

*Primary Examiner*—Anne Marie Boehler
*Assistant Examiner*—Peter C. English
*Attorney, Agent, or Firm*—Brooks & Kushman

[57] ABSTRACT

A relatively flexible thermoplastic air bag cover is provided including a front panel wherein a curved border area about a switch location area of the front panel gradually and continuously decreases in thickness. This feature enhances actuation of a membrane-type switch which lies behind a rear inner surface of the front panel in the switch location area. This feature allows the switch to be activated in a switch activation area which includes all of the switch location area and a portion of the border area. This feature also allows the front panel to be properly molded so that the front panel has a class-A surface on its front outer surface.

6 Claims, 1 Drawing Sheet

THERMOPLASTIC AIR BAG COVER HAVING A MEMBRANE SWITCH

CROSS-REFERENCE TO RELATED APPLICATION

This invention is related to U.S. patent application Serial No. 08/407,925 filed Mar. 21, 1995 entitled "Air Bag Cover Having A Switch Assembly Disposed Therein".

TECHNICAL FIELD

This invention relates to plastic air bag covers having switch assemblies therein and, in particular, to such covers which are affixable to air bag containers.

BACKGROUND ART

Presently, when air bag covers are provided in automobiles on the driver's side of the vehicle, the air bag is stored in the steering column behind an air bag cover. During automatic inflation of the air bag, the air bag cover moves away from the steering column to permit its safety function between the steering column and the operator of the vehicle.

Recent practice in the automotive industry is utilization of all plastic fabricated air bag covers. Conventional air bag covers used in conjunction with occupant restraint systems often include various connection systems for attaching the air bag cover to the uninflated air bag container. As those skilled in the art will recognize, such systems normally include a two piece cover construction wherein a first cover portion, usually manufactured from a relatively stiff material, is initially disposed directly over the uninflated air bag container. A second more resilient cover portion is next affixed over the first cover portion and used as the outer decorative cover.

U.S. Pat. No. 4,325,568 issued to Clark et al. discloses a modular occupant restraint system including an inflator, a cushion, a container for the cushion and an air bag cover for the container assembled as a module. Clark et al. utilizes a two piece air bag cover construction.

U.S. Pat. No. 5,085,462 issued to Gaultier discloses an air bag and vehicle horn switch assembly. Gaultier also discloses a conventional two piece cover construction.

U.S. Pat. No. 5,186,490 issued to Adams et al. discloses a cover for a inflatable restraint system for a motor vehicle which contains a slot in the upper wall thereof into which a replaceable thin or membrane type switch assembly is inserted. Adams et al. further discloses an air bag cover having an injection molded thermoplastic upper wall and a soft outer cover exposed to the interior of the vehicle manufactured from urethane, vinyl or polyester. The outer cover completely encompasses and overlaps the upper wall structure and uninflated air bag forming two structures the air bag must exit to carry out its function.

The Embach U.S. Pat. No. 4,934,735, discloses a device which has inner and outer covers or plates, each of which has split lines which separate the upper walls into upwardly and oppositely opening upper and lower pairs of flaps to permit deployment of the inflatable cushion. A switch assembly is located between either or both pair of flaps and includes one or more membrane switches located between the flaps and respective key pads projecting outwardly of the cover flap for closing respective pairs of circuits on the upper and lower flexible membranes of the membrane switch to each other.

The Heidorn U.S. Pat. No. to 5,308,106, discloses an air bag module cover assembly with a switch subassembly removably attached at a front surface of the assembly.

The Winget U.S. Pat. No. 5,062,661, discloses a rigid plate attached to the substantially rigid remainder of a front panel of an air bag cover to define a hollow compartment which together move upon manual actuation of a flexible, manually operable diaphragm at the front surface of the front panel. Upon separation from the side panel, the front panel, including the diaphragm, the hollow compartment and a rigid plate move together to permit the inflating air bag to leave the cover. The front panel has a first electrically conductive inner surface for making a circuit path with a corresponding second electrically conductive inner surface of the rigid plate.

The Cooke, II, U.S. Pat. No. 5,344,185, discloses an air bag cover having a replaceable horn switch and a removable cover band.

The Leonelli U.S. Pat. No. 5,369,232 discloses a membrane horn blow switch integrated into the front panel of an air bag cover. More specifically, the membrane switch seats in and fills a horn actuation area which is a step-down portion of the cover reduced in thickness to approximately 1.0–2.0 mm. The thinning of this "horn actuation area" is said to increase the flexibility of the cover. The horn actuation area is bounded at its vertical extremes by posts which project rearwardly from the inner surface of the cover. The "normal thickness" of the front wall of the cover is on the order of 2.5–3.0 mm. The portion of the cover occupied by the actuation area appears to be substantially less than 50% of the surface area of the front panel of the cover.

Some of the above switches are relatively small and oftentimes inaccessible for drivers who have large hands or for drivers who have limited manual dexterity. Also, prior art air bag covers are formed contrary to good molding practices and will involve plastic flow problems, especially in step-down area.

DISCLOSURE OF THE INVENTION

An object of the present invention is to provide an air bag cover having a membrane switch incorporated therein which is actuable over a relatively large surface area of the air bag cover and which is constructed in accordance with sound plastic-molding practices.

In carrying out the above object and other objects of the present invention a relatively flexible thermoplastic air bag cover is provided. The air bag cover includes a front panel adapted to overlie an undeployed air bag. The front panel has a front outer surface and a rear inner surface and is separable along a prescribed tear pattern upon deployment of the air bag. The front panel has a switch location area and a border area integrally formed with and extending completely about the switch location area. The border area has an outer edge portion and an inner edge portion immediately adjacent the switch location area. The border area of the front panel gradually decreases in thickness from its outer edge portion to the switch location area between the rear inner surface and the front outer surface. The air bag cover also includes a membrane-type switch lying behind the rear inner surface in the switch location area of the front panel and a backplate secured to the rear inner surface of the back panel in containing relation to the membrane-type switch and forming a hollow compartment for the switch in the switch location area. The switch location area and a portion of the border area define a switch activation area.

The advantages accruing to the air bag cover as constructed above are numerous. For example, the gradual decrease in thickness of the border area enlarges the effective area for activation of the membrane switch. Also, the gradual decrease in thickness of the border area achieves the following advantages:

(a) one can more easily flow the plastic material into a reduced flow area;

(b) there is reduced risk of additional shearing of material;

(c) there is reduced risk of nonfill spots occurring in the thin area;

(d) there is avoidance of a surface read-through due to wall thickness changes; and (e) there is avoidance of surface read-through in the horn activation area after paint has been baked on the air bag cover.

These and other features and additional objects of the invention will occur to those skilled in the art on reading the following description with reference to the accompanying drawings.

BEST MODE FOR CARRYING OUT THE INVENTION

Figure 1:
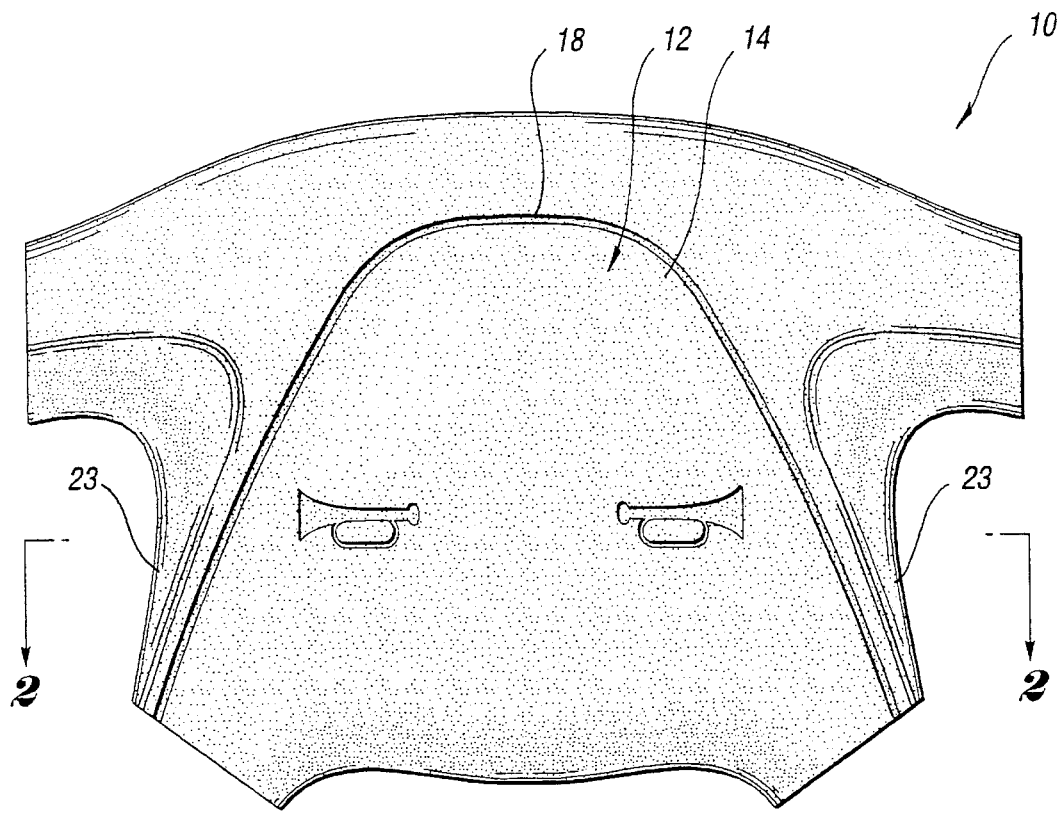
FIG. 1 is a front elevational view of an air bag cover constructed in accordance with the present invention.
Figure 2:
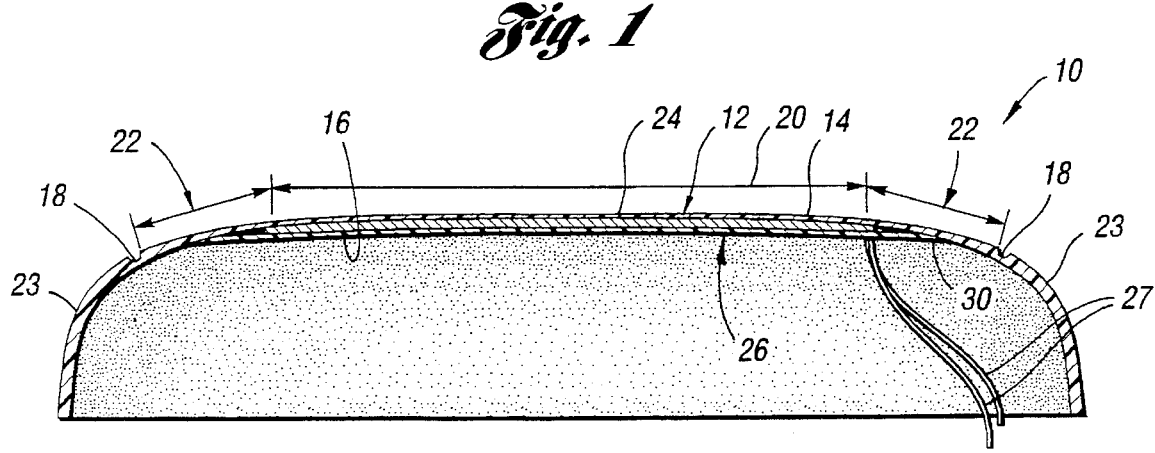
FIG. 2 is a sectional view of the air bag cover of FIG. 1, taken along lines 2—2 of FIG. 1.
Figure 3:
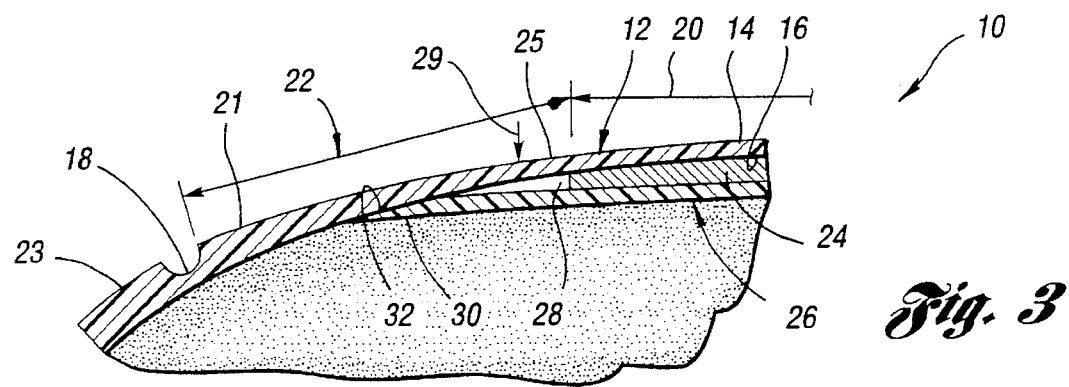
FIG. 3 is an enlarged view of a portion of FIG. 2 partially broken away and further illustrating the present invention.

Referring now to the drawing Figures, there is illustrated in FIGS. 1–3 an automotive air bag cover generally indicated at 10, constructed in accordance with the present invention. Typically, the automotive air bag cover is adapted to be secured at the top end of the vehicle drive column (not shown) at the steering wheel of the vehicle.

The air bag cover 10 is preferably a relatively flexible thermoplastic air bag cover formed by injection molding with a thermoplastic such as Santoprene (a trademark of Monsanto Company).

The air bag cover 10 includes a front panel 12 overlying an undeployed air bag (not shown). The front panel 12 has a front outer surface 14 and a rear inner surface 16.

The front panel is separable along a prescribed tear pattern 18 upon deployment of the air bag. The front panel 12 includes a switch location area 20 in the range of 1.0–2.2 mm in thickness, and an integrally formed curved border area, generally indicated at 22, which extends completely about the switch location area 20 from curved side walls 23 of the air bag cover 10. The border area 22 includes an outer edge portion 21 and an inner edge portion 25 bordering the switch location area 20.

The air bag cover 10 also includes a membrane type switch, schematically illustrated at 24, which lies behind the rear inner surface 16 of the front panel 12 in switch location area 20. The switch 24 includes electrical leads 27 connected to the vehicle's electrical system.

The air bag cover also includes a plastic back plate, generally indicated at 26, which is secured by being thermally bonded to the rear inner surface 16 of the front panel 12 in containing relation to the membrane-type switch 24 to form a hollow compartment 28 for the switch 24.

As clearly illustrated in FIG. 3, the border area 22 of the front panel 12 gradually and continuously decreases in thickness from its outer edge portion 21 to the switch location area 20 between the rear inner surface 16 and the front outer surface 14. Consequently, the border area 22 and the switch location area 20 are together thinned relative to the nominal wall thickness of the curved side walls 23 (i.e., typically 3 mm–4 mm). Preferably, the border area 22 gradually and continuously decreases in thickness in the range of 20%–80% from its outer edge portion 21 to the switch location area 20. The border area 22 is at least 3 mm in length and is preferably much larger in length as illustrated in the drawing figures.

Also, preferably, the border area 22 gradually and continuously decreases in thickness from the outer edge portion 21 to the switch location area 20 so that for every mm the border area 22 decreases in thickness, there is at least one mm of movement towards the switch location area 20 from the outer edge portion 21. In other words, the front outer surface 14 of the border area 22 curves substantially less than the rear inner surface 16 of the border area 22 from the outer edge portion 21 to the switch location area 20 so that the distance to the switch location area 20 changes at least as fast as the decrease in thickness.

As shown in the drawing figures, the ratio of the length of the border area 22 to the corresponding decrease in thickness over the length is approximately 20:1. This ratio may fall in a range of 1:1 to 20:1 or higher such as 100:1. This feature allows for enhanced membrane switch activation externally of the switch location area 20 even to a position indicated by an arrow 29. The switch location area 20 and a portion of the border area 22, at least up to an including the arrow 29, define a switch activation area. In other words, flexing of the front panel 12 away from the switch location area 20, and particularly, in the border area 22, may be transmitted to the membrane switch 24 and provide an effectively larger area for switch actuation.

Also, this feature has the following advantages:

(a) one can more easily flow the plastic material into the reduced flow area of the switch activation area 20;

(b) there is reduced risk of additional shearing of material;

(c) there is reduced risk of nonfill spots occurring in the thin area of the switch activation area 20;

(d) there is avoidance of surface read through due to wall thickness changes; and (e) there is avoidance of surface read through in the horn activation area 20 after any paint on the front outer surface 14 of the front panel 12 has been dried in a bake oven.

As also clearly illustrated in FIG. 3, the back plate 26 has a peripheral attachment portion 30 including an angled side edge surface 32, which is secured or bonded to the rear inner surface 16 of the border area 22 of the front panel 12. The attachment portion 30 of the back plate 26 gradually increases in thickness from a position adjacent the prescribed tear pattern 18 to the switch location area 20. In this way, a relatively large amount of surface area of the back plate 26 is utilized to secure the back plate 26 to the rear inner surface 16 of the front panel 12 thereby providing a very secure attachment thereto.

As further illustrated in FIG. 3, the hollow compartment 28 has a peripheral edge portion between the rear inner surface 16 of the front panel 12 and the back plate 26. The peripheral edge portion of the hollow compartment 28 gradually increases in thickness or width from the attachment portion 30 of the back plate 26 to the switch location area 20.

As can also be seen in FIG. 3, the switch location area 20 of the front panel 12 has a substantially uniform thickness and preferably the substantially uniform thickness of the front panel 12 in this switch location area 20 is approximately 1.0–2.2 mm.

While only certain embodiments of the method and apparatus of the present invention have been shown and described, others may be possible without departing from the scope of the following claims.

What is claimed is:

1. A relatively flexible thermoplastic air bag cover comprising: a front panel adapted to overlie an undeployed air bag, the front panel having a front outer surface and a rear inner surface and being separable along a prescribed tear pattern upon deployment of the air bag, the front panel having a switch location area and a border area integrally formed with and extending completely about the switch location area; the border area having an outer edge portion and an inner edge portion immediately adjacent the switch location area, the border area of the front panel gradually decreases in thickness from its outer edge portion to the switch location area between the rear inner surface and the front outer surface; a membrane-type switch lying behind the rear inner surface in the switch location area of the front panel; and a back plate secured to the rear inner surface of the front panel in containing relationship to the membrane-type switch and forming a hollow compartment for the switch in the switch location area wherein the switch location area and a portion of the border area define a switch activation area.

2. The air bag cover of claim 1 wherein the back plate has an attachment portion including an angled side edge surface secured to the rear inner surface of the border area and wherein the attachment portion of the back plate gradually increases in thickness from a position adjacent the outer edge portion of the border area to the switch location area.

3. The air bag cover as claimed in claim 2 wherein the hollow compartment has a peripheral edge portion between the rear inner surface and the back plate wherein the peripheral edge portion of the hollow compartment gradually increases in thickness from the attachment portion to the switch location area.

4. The air bag cover as claimed in claimed 1 wherein the switch location area of the front panel has a substantially uniform thickness.

5. The air bag cover as claimed in claim 4 wherein the substantially uniform thickness of the switch location area of the front panel is in the range of 1.0–2.2 mm.

6. The air bag cover as claimed in claim 1 wherein the border area has a length measured over its radial dimension, and wherein the border area gradually and continuously decreases in thickness toward the switch location area so that a ratio of the length to a corresponding decrease in thickness of the border area over the length (length of border area/change in border area thickness) falls in the range of 1:1 to 100:1.

* * * * *